US007639602B2

(12) United States Patent
Aoki

(10) Patent No.: US 7,639,602 B2
(45) Date of Patent: Dec. 29, 2009

(54) MOBILE RADIO SYSTEM CAPABLE OF CONTROLLING BASE RADIO STATION WITHOUT IMPOSSIBILITY

(75) Inventor: Hiroshi Aoki, Kanagawa (JP)

(73) Assignee: Juniper Networks, Inc., Sunnyvale, CA (US)

( * ) Notice: Subject to any disclaimer, the term of this patent is extended or adjusted under 35 U.S.C. 154(b) by 660 days.

(21) Appl. No.: 11/213,773

(22) Filed: Aug. 30, 2005

(65) Prior Publication Data

US 2005/0281245 A1 Dec. 22, 2005

(51) Int. Cl.
*G01R 31/08* (2006.01)
(52) U.S. Cl. ...................................... 370/216; 370/409
(58) Field of Classification Search ................. 370/216, 370/310.1, 310.2, 328, 349, 395.2, 395.3, 370/409
See application file for complete search history.

(56) References Cited

U.S. PATENT DOCUMENTS

| 5,398,238 | A | * | 3/1995 | Inagawa et al. | 370/294 |
| 5,648,969 | A | | 7/1997 | Pasternak et al. | 370/349 |
| 5,774,461 | A | | 6/1998 | Hyden et al. | 370/329 |
| 6,343,322 | B2 | | 1/2002 | Nagami et al. | 709/227 |

FOREIGN PATENT DOCUMENTS

| EP | 0 888 028 A2 | 12/1998 |
| JP | 10-190675 | 7/1998 |
| JP | 2000-156707 | 6/2000 |
| JP | 2000-261528 | 9/2000 |
| KR | A 1997-0068243 | 10/1997 |
| WO | WO 96/14720 | 5/1996 |

OTHER PUBLICATIONS

"Mobile Radio System Capable of Resetting in an Improperly Set VPI/VCI"; U.S. Appl. No. 09/589,511, filed Jun. 8, 2000.

* cited by examiner

*Primary Examiner*—Chirag G Shah
*Assistant Examiner*—Minh-Trang Nguyen
(74) *Attorney, Agent, or Firm*—Harrity & Harrity, LLP

(57) ABSTRACT

A mobile radio system comprises first through N-th radio base stations, where N represents a positive integer which is greater than one. On a start-up sequence of an n-th radio base station, a base station control apparatus transmits an n-th individual identifier as a station identifier to the n-th radio base station to allocate the n-th individual identifier to the n-th radio base station, where n is a variable between one and N, both inclusive. The base station control apparatus transmits a transmission message signal having the n-th individual identifier as a transmission individual identifier to the n-th radio base station to carry out a link connection between the base station control apparatus and the n-th radio base station. In the n-th radio base station, an ATM reception section compares the transmission individual identifier with the n-th station identifier to abandon the transmission message signal when the transmission individual identifier is not coincident with the n-th station identifier. A CPU makes the ATM reception section become a reset state when the ATM reception section continues to abandon the message signal during a predetermined time duration.

4 Claims, 3 Drawing Sheets

MOBILE RADIO SYSTEM CAPABLE OF CONTROLLING BASE RADIO STATION WITHOUT IMPOSSIBILITY

BACKGROUND OF THE INVENTION

This invention relates to a mobile radio system, and more particularly, to a link connection procedure in a mobile radio system using an asynchronous transmission mode (ATM).

In general, a mobile radio system is known which comprises a plurality of radio base stations each of which is connected to a base station control apparatus by an asynchronous transmission mode (ATM) fashion.

In such a system, it is necessary for header information of 24 bits in an ATM cell to have an individual value in each of the radio base stations inasmuch as the header information must be recognized in the base station control apparatus on carrying out transmission and reception between the base station control apparatus and each of the radio base stations. The header information may be representative of an identifier and may be called a VPI/VCI in ATM fashion. When each of the radio base stations starts up in the mobile radio system, the VPI/VCI is not determined in each of the radio base stations. Therefore, it is necessary to individually allocate the VPI/VCI to each of the radio base stations by the base station control apparatus.

The base station control apparatus manages the VPI/VCI of each radio base station. The VPI/VCI at the time of setting to each radio base station may be different from the VPI/VCI at the subsequent time, by mistake such as a line error, as will be described later.

Inasmuch as the radio base station carries out reception of a message signal in accordance with the VPI/VCI, it is impossible for a specific one of the radio base stations to receive the message signal when the VPI/VCI varies in the specific radio base station. It is impossible to control the specific radio base station by the base station control apparatus. As a result, it is necessary for a person to go to the place where the specific radio base station is installed, in order to reset the specific radio base station.

SUMMARY OF THE INVENTION

It is an object of this invention to provide a mobile radio system capable of preventing control of each of radio base stations from becoming impossible.

Other objects of this invention will become clear as the description proceeds.

On describing the gist of this invention, it is possible to understand that a mobile radio system comprises a base station control apparatus for controlling first through N-th radio base stations each of which is connected to said base station control apparatus, where N represents a positive integer which is greater than one. The base station control apparatus transmits first through N-th individual identifiers as first through N-th station identifiers to the first through the N-th radio base stations to allocate the first through the N-th individual identifiers to the first through the N-th radio base stations, respectively, on a start-up sequence of each of the first through the N-th radio base stations. The base station control apparatus transmits a transmission message signal having an n-th individual identifier as a transmission individual identifier to an n-th radio base station to carry out a link connection between the base station control apparatus and the n-th radio base station, where n is a variable between one and N, both inclusive.

According to this invention, the n-th radio base station comprises first means for comparing the transmission individual identifier with the n-th station identifier to abandon the transmission message signal when the transmission individual identifier is not coincident with the n-th station identifier and second means for making the first means become a reset state when the first means continues to abandon the transmission message signal during a predetermined time duration.

DESCRIPTION OF THE PREFERRED EMBODIMENT

Figure 1:
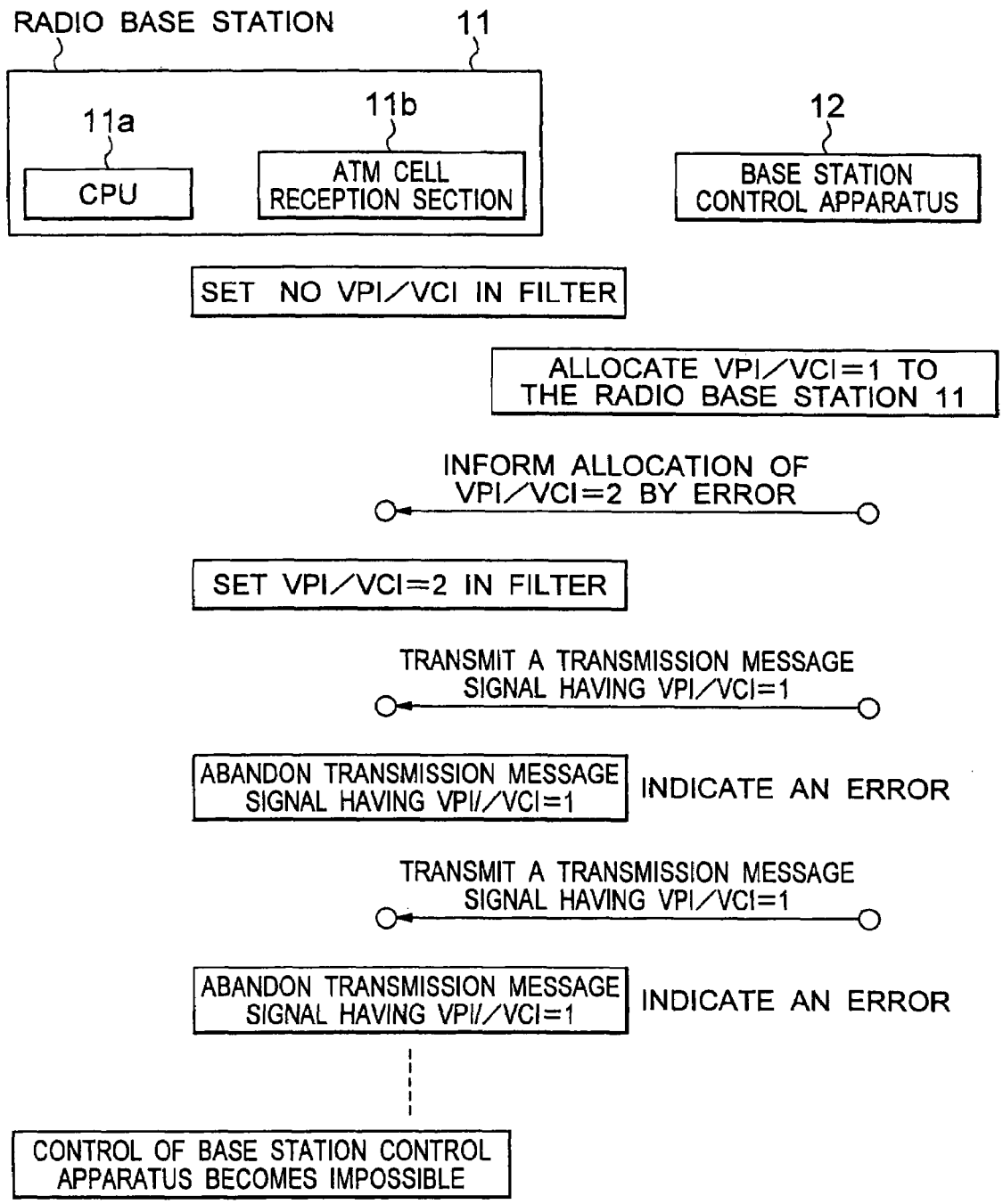
FIG. 1 shows a view for describing a link connection of a conventional mobile radio system.

Referring to FIG. 1, a link connection of a conventional mobile radio system will be described at first in order to facilitate an understanding of this invention. It will be assumed that a radio base station 11 starts up and that VPI/VCI="1" should be allocated to the radio base station 11. At this time, it will be assumed that a base station control apparatus 12 allocates VPI/VCI="2" to the radio base station 11 by mistake such as a line error. More particularly, the base station control apparatus 12 may transmit an allocation signal having VPI/VCI="2" to the radio base station 11. In the radio base station 11, the allocation signal is received by an ATM cell reception section 11b. Supplied with the allocation signal, a central processing unit (CPU) 11a sets VPI/VCI="2" in a VPI/VCI filter (not shown).

As readily understood from the above description, the base station control apparatus 12 recognizes that the VPI/VCI of the radio base station A is equal to "1". Therefore, the base station control apparatus 12 makes the VPI/VCI be "1" in order to transmit a message signal to the radio base station 11. Inasmuch as the VPI/VCI filter actually has VPI/VCI="2", the radio base station 11 abandons the message signal having VPI/VCI="1" and turns on a light to indicate an error.

When the base station control apparatus 12 again makes the VPI/VCI be "1" in order to transmit the message signal to the radio base station 11, the radio base station 11 abandons the message signal having VPI/VCI="1" and turns on the light to indicate the error inasmuch as the VPI/VCI filter has VPI/VCI="2".

As described above, the base station control apparatus manages the VPI/VCI in each of the radio base stations. The VPI/VCI at the time of setting to each radio base station may be different from the VPI/VCI at the subsequent time, by mistake such as the line error.

Inasmuch as the radio base station carries out reception of a message signal in accordance with the VPI/VCI, it is impossible for a specific one of the radio base stations to receive the message signal when the VPI/VCI varies in the specific radio base station. It is impossible to control the specific radio base station by the base station control apparatus. As a result, it is necessary for a person to go to the place where the specific radio base station is installed, in order to reset the specific radio base station.

Figure 2:
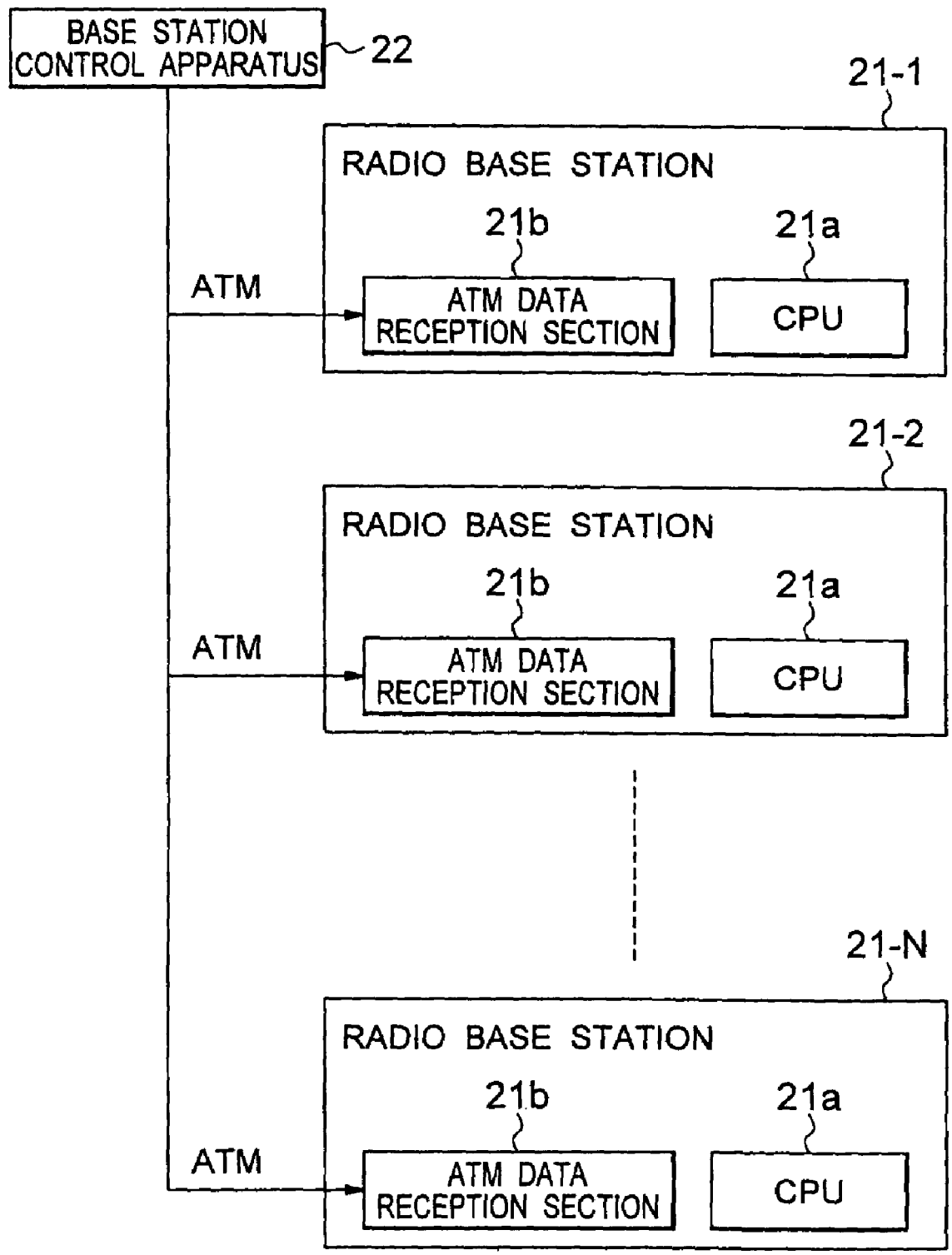
FIG. 2 is a block diagram of a mobile radio system according to a preferred embodiment of this invention.

Referring to FIG. 2, description will proceed to a mobile radio system according to a preferred embodiment of this invention. The mobile radio system comprises first through N-th radio base stations 21-1 to 21-N which are connected to a base station control apparatus 22 by an ATM fashion, where N is a positive integer which is greater than one. Each of the radio base stations 21-1 to 21-N has first through N-th radio area, respectively. When a mobile station (not shown) is located in a specific one of the first through the N-th radio area, the mobile station communicates with a specific one of the first through the N-th radio base stations that has the specific radio area. In the example being illustrated, each of the first through the N-th radio base stations comprises a central processing unit (CPU) 21a and an ATM data reception section 21b. The base station control apparatus 22 transmits a transmission message signal to each of the first through the N-th radio base stations 21 to 21-N. The transmission message signal comprises a plurality of ATM cells each of which has a transmission VPI/VCI as transmission header information. In each of the first through the N-th radio base stations, the ATM data reception section 21b filters the transmission VPI/VCI of each ATM cell to receive the ATM cell. More particularly, the ATM data reception section 21b receives the ATM cell to transfer the ATM cell to the CPU 21a when the transmission VPI/VCI of the ATM is coincident with an individual VPI/VCI. On the other hand, the ATM data reception section 21b abandons the ATM cell when the transmission VPI/VCI of the ATM is not coincident with the individual VPI/VCI.

Figure 3:
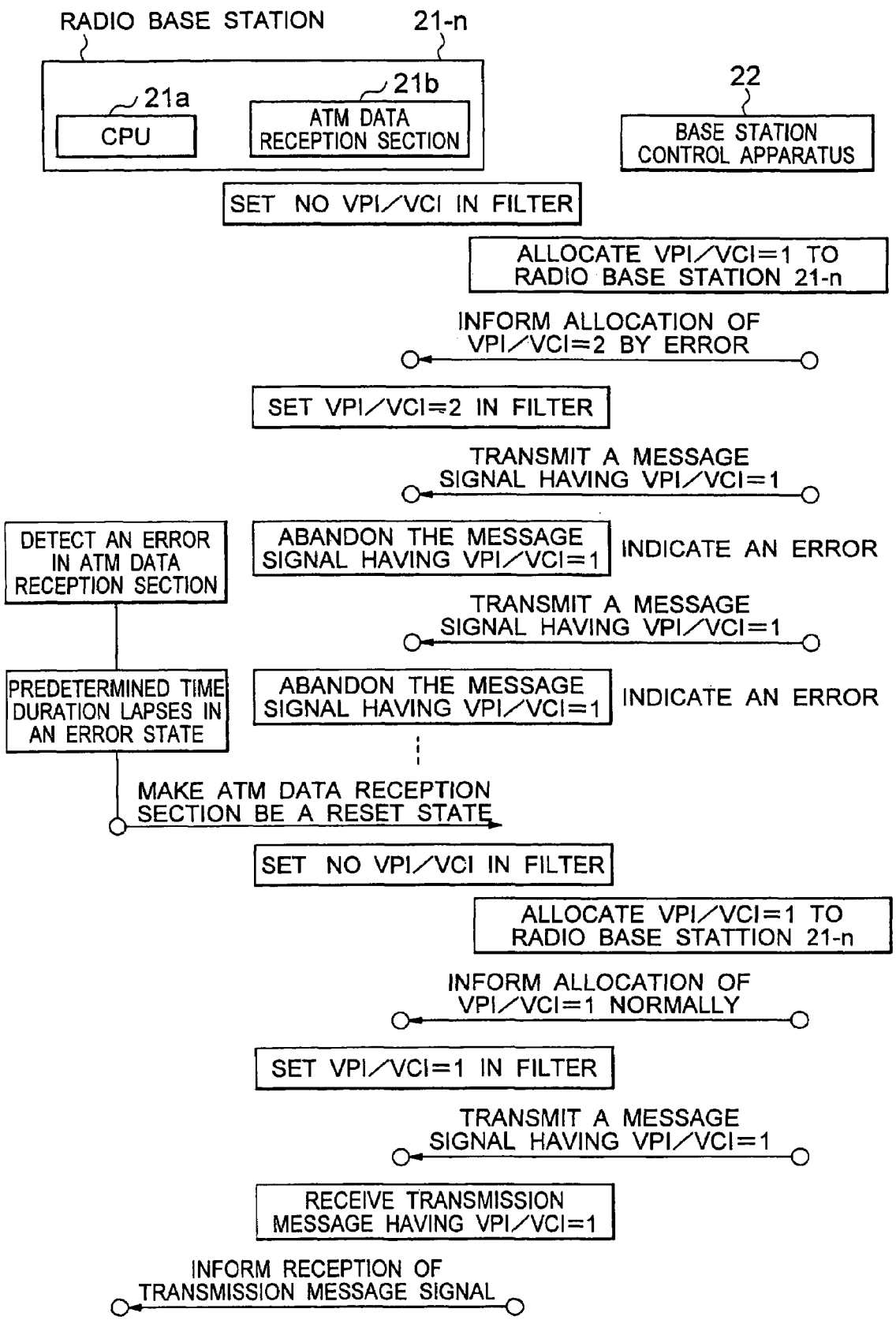
FIG. 3 shows a view for describing a link connection in the mobile radio system illustrated in FIG. 2.

Referring to FIG. 3 in addition to FIG. 2, it will be assumed that an n-th radio base station 21-n starts up in accordance with a start-up sequence, where n is a variable between 1 and N, both inclusive. The individual VPI/VCI has not been set in the n-th radio base station 21-n yet. It will be assumed that the base station control apparatus 22 should allocate VPI/VCI="1" to the n-th radio base station 21-n. At this time, it will be assumed that the base station control apparatus 22 allocates VPI/VCI="2" to the n-th radio base station 21-n by mistake such as a line error. More particularly, the base station control apparatus 22 may transmit an allocation signal having VPI/VCI="2" to the n-th radio base station 21-n by mistake such as a line error. In the n-th radio base station 21-n, the allocation signal is received by the ATM cell reception section 21b. Supplied with the allocation signal, the CPU 21a sets VPI/VCI="2" in a VPI/VCI filter (not shown).

As readily understood from the above description, the base station control apparatus 22 recognizes that the individual VPI/VCI of the n-th radio base station 21-n is equal to "1". Therefore, the base station control apparatus 22 makes the transmission VPI/VCI be "1" in order to transmit the transmission message signal to the n-th radio base station 21-n. Inasmuch as the VPI/VCI filter actually has VPI/VCI="2", the n-th radio base station 21-n abandons the message signal having VPI/VCI="1" and indicates an error inasmuch as the VPI/VCI filter has the individual VPI/VCI="2". More particularly, the CPU 21a detects the error when the ATM cell reception section 21b indicates the error.

When the base station control apparatus 22 again makes the transmission VPI/VCI be "1" in order to transmit the transmission message signal to the n-th radio base station 21-n, the radio base station 11 abandons the transmission message signal having VPI/VCI="1" and indicates an error inasmuch as the VPI/VCI filter has the individual VPI/VCI="2". More particularly, the CPU 21a detects the error when the ATM cell reception section 21b indicates the error.

As described above, the ATM cell reception section 21b becomes an error state when the transmission VPI/VCI is not coincident with the individual VPI/VCI. When the error state continues during a predetermined time duration, the CPU 21a resets the ATM data reception section 21b to make the VPI/VCI filter become "no-set". More particularly, the predetermined time duration lapses after the ATM cell reception section 21b becomes the error state.

After the CPU 21a resets the ATM data reception section 21b, the base station control apparatus 22 again transmit an allocation signal having VPI/VCI="1" to the n-th radio base station 21-n without a mistake such as a line error. In the n-th radio base station 21-n, the allocation signal is received by the ATM cell reception section 21b. Supplied with the allocation signal, the CPU 21a sets VPI/VCI="1" in the VPI/VCI filter.

As readily understood from the above description, the base station control apparatus 22 recognizes that the individual VPI/VCI of the n-th radio base station 21-n is equal to "1". Therefore, the base station control apparatus 22 makes the transmission VPI/VCI be "1" in order to transmit the transmission message signal to the n-th radio base station 21-n. Inasmuch as the VPI/VCI filter actually has VPI/VCI="1", the ATM data reception section 21b receives the transmission message signal having VPI/VCI="1" in the n-th radio base station 21-n. After the ATM data reception section 21b receives the transmission message signal having VPI/VCI="1" in the n-th radio base station 21-n, the ATM data reception section 21b informs the CPU 21a of a reception of the transmission message signal.

As described above, each of the radio base stations carries out a reset to wait for allocation of the individual VPI/VCI in case where the error state continues during the predetermined time duration in the start-up sequence of radio base station. Therefore, it is unnecessary for a person to go to a place where an error radio base station is installed, in order to reset the error radio base station, even if the transmission VPI/VCI is not coincident with the individual VPI/VCI by mistake such as a line error.

The CPU 21a monitors the ATM cell reception section 21b to detect the error state of the ATM cell reception section 21b. When the error state continues in the ATM cell reception section 21b during the predetermined time duration, the CPU 21a judges that the transmission VPI/VCI is not coincident with the individual VPI/VCI. The CPU 21a resets the ATM cell reception section 21b. Therefore, it is possible to easily prevent control of each radio base station from becoming impossible. It is unnecessary for a person to go to a place where an error radio base station is installed, in order to reset the error radio base station While this invention has thus far been described in conjunction with the preferred embodiment thereof, it will readily be possible for those skilled in the art to put this invention into practice in various other manners.

What is claimed is:

1. A radio base station of a plurality of radio base stations connected to a base station control apparatus, comprising:
   a VPI/VCI filter to store a VPI/VCI value or a no-set identifier, the no-set identifier indicating that the radio base station is in an unconfigured state;
   a data reception section to:
      receive a first VPI/VCI value from the base station control apparatus during a staff-up sequence of the radio base station,
      store the first VPI/VCI value in the VPI/VCI filter,
      receive a transmission message signal from the base station control apparatus also during the start-up sequence of the radio base station, and
      generate an error signal to signify an error state when the transmission message signal includes a second VPI/VCI value different from the first VPI/VCI value; and
   a processor, connected to the VPI/VCI filter and the data reception section, to:

detect the error signal, determine whether the error state continues for at least a predetermined time duration during the start-up sequence of the radio base station, and store the no-set identifier in the VPI/VCI filter when the error state is determined to continue for at least a predetermined time duration during the start-up sequence of the radio base station.

2. A radio base station of a plurality of radio base stations connected to a base station control apparatus, comprising:

a filter to store an identification value or a no-set identifier, the no-set identifier indicating that the radio base station is in an unconfigured state;

a data reception section to:

receive a first identification value from the base station control apparatus during a staff-up sequence of the radio base station, store the first identification value in the filter, receive a transmission message signal from the base station control apparatus also during the start-up sequence of the radio base station, determine that the transmission message signal includes a second identification value that is different from the first identification value, and generate an error signal to signify an error state when the transmission message signal includes the second identification value that is different from the first identification value; and a processor, connected to the filter and the data reception section, to:

detect the error signal, and store, in response to the detected error signal, the no-set identifier in the filter to reset the filter and cause the base station control apparatus to send another identification value.

3. A method performed by a radio base station of a plurality of radio base stations connected to a base station control apparatus, comprising:

receiving a first identification value from the base station control apparatus during a staff-up sequence of the radio base station;

storing the first identification value;

receiving a transmission message signal from the base station control apparatus also during the staff-up sequence of the radio base station;

determining that the transmission message signal includes a second identification value that is different from the first identification value;

generating an error signal to signify an error state when the transmission message signal includes the second identification value that is different from the first identification value;

detecting the error signal;

determining, in response to detecting the error signal, whether the error state continues for at least a predetermined time duration during the staff-up sequence of the radio base station; and overwriting the first identification value with a no-set identifier when the error state is determined to continue for at least a predetermined time duration during the staff-up sequence of the radio base station, the no-set identifier indicating that the radio base station is in an unconfigured state.

4. A radio base station of a plurality of radio base stations connected to a base station control apparatus, comprising:

means for receiving a first VPI/VCI value from the base station control apparatus during a start-up sequence of the radio base station;

means for storing the first VPI/VCI value;

means for receiving a transmission message signal from the base station control apparatus also during the start-up sequence of the radio base station;

means for generating an error signal to signify an error state when the transmission message signal includes a second VPI/VCI value different from the first VPI/VCI value;

means for detecting the error signal;

means for determining, in response to detecting the error signal, whether the error state continues for at least a predetermined time duration during the staff-up sequence of the radio base station; and means for overwriting the first VPI/VCI value with a no-set identifier when the error state is determined to continue for at least a predetermined time duration during the start-up sequence of the radio base station, the no-set identifier indicating that the radio base station is in an unconfigured state.

* * * * *